United States Patent
Sanou (10) Patent No.: US 10,628,039 B2
(45) Date of Patent: Apr. 21, 2020

(54) INPUT DEVICE AND INPUT METHOD

(71) Applicant: KYOCERA Document Solutions Inc., Osaka (JP)

(72) Inventor: Masaki Sanou, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 56 days.

(21) Appl. No.: 16/009,555

(22) Filed: Jun. 15, 2018

(65) Prior Publication Data

US 2019/0004696 A1    Jan. 3, 2019

(30) Foreign Application Priority Data

Jun. 30, 2017  (JP) .................................. 2017-128864

(51) Int. Cl.
G06F 3/0488  (2013.01)
G06F 3/01    (2006.01)
G06F 3/0489  (2013.01)

(52) U.S. Cl.
CPC .......... *G06F 3/04886* (2013.01); *G06F 3/018* (2013.01); *G06F 3/0489* (2013.01)

(58) Field of Classification Search
CPC .............................. G06F 3/04886; G06F 3/018
See application file for complete search history.

(56) References Cited

U.S. PATENT DOCUMENTS

| | | | |
|---|---|---|---|
| 2006/0053387 A1* | 3/2006 | Ording ................ | G06F 3/04883 715/773 |
| 2007/0198949 A1* | 8/2007 | Rummel ............... | G06F 3/0482 715/810 |
| 2008/0222569 A1* | 9/2008 | Champion ............ | G06F 3/0482 715/834 |

(Continued)

FOREIGN PATENT DOCUMENTS

JP    2014-116726 A    6/2014

OTHER PUBLICATIONS

JapaneseUp, "The Dummies Guide to Converting Japanese Letters on Your Windows 7 or 8 PC," Sep. 30, 2015, https://web.archive.org/web/20150930015915/https://japaneseup.com/converting-japanese-letters/.*

(Continued)

*Primary Examiner* — Ryan Barrett
(74) *Attorney, Agent, or Firm* — Studebaker & Brackett PC (57) ABSTRACT

An input device includes a display, a detector, and a controller. A setting target character unit corresponds to a conversion range including a specific number of characters. The controller causes the display to display a conversion range reduction key and a conversion range increase key. In response to detection of a touch on the conversion range reduction key, the controller causes the display to display, in place of the setting target character unit included in a to-be-confirmed character string, a setting target character unit corresponding to a conversion range including at least (Continued)

one character fewer than the specific number. In response to detection of a touch on the conversion range increase key, the controller causes the display to display, in place of the setting target character unit included in the to-be-confirmed character string, a setting target character unit corresponding to a conversion range including characters more than the specific number.

10 Claims, 10 Drawing Sheets

(56) References Cited

U.S. PATENT DOCUMENTS

| 2009/0225041 | A1* | 9/2009 | Kida | G06F 3/0237 |
| | | | | 345/173 |
| 2012/0113011 | A1* | 5/2012 | Wu | G06F 3/018 |
| | | | | 345/169 |
| 2013/0132871 | A1* | 5/2013 | Zeng | G06F 3/018 |
| | | | | 715/762 |
| 2016/0370996 | A1* | 12/2016 | Kida | G06F 3/0237 |
| 2017/0277430 | A1* | 9/2017 | Ukai | G06F 3/0482 |

OTHER PUBLICATIONS

NihonShock, "12 Tips to use your Japanese IME better," Apr. 1, 2010, http://nihonshock.com/2010/04/12-japanese-ime-tips/.*

* cited by examiner

INPUT DEVICE AND INPUT METHOD

INCORPORATION BY REFERENCE

The present application claims priority under 35 U.S.C. § 119 to Japanese Patent Application No. 2017-128864, filed on Jun. 30, 2017. The contents of this application are incorporated herein by reference in their entirety.

BACKGROUND

The present disclosure relates to an input device and an input method.

Input devices including a display that displays a software keyboard are widely used in recent years. In a mobile electronic device (input device), a software keyboard including an input key is displayed on a display surface of a touch panel. A controller detects a touch on the input key based on a result of detection by a touch sensor and then causes display of a flick guide that indicates a relationship between characters each assigned to the input key and flick directions. A flick direction is determined based on a position touched by a touch operation, and a corresponding character is input.

SUMMARY

An input device according to the present disclosure includes a display, a detector, and a controller. The display has a display surface. The detector detects a touch on the display surface by a detection target. The controller causes the display to display a plurality of operation keys. The plurality of operation keys include a conversion key and character input keys. At least one symbol is associated with each of the character input keys. In response to detection of touches on the character input keys by the detection target, the controller causes the display to display an input character string. In response to detection of a touch on the conversion key by the detection target in a state in which the input character string is displayed on the display surface of the display, the controller converts the input character string into a to-be-confirmed character string. The to-be-confirmed character string includes a setting target character unit. The setting target character unit corresponds to a conversion range including a specific number of characters. In response to detection of a touch on the conversion key by the detection target, the controller causes the display to display a conversion range reduction key and a conversion range increase key. In response to detection of a touch on the conversion range reduction key by the detection target, the controller causes the display to display, in place of the setting target character unit included in the to-be-confirmed character string, a setting target character unit corresponding to a conversion range including at least one character fewer than the specific number of characters. In response to detection of a touch on the conversion range increase key by the detection target, the controller causes the display to display, in place of the setting target character unit included in the to-be-confirmed character string, a setting target character unit corresponding to a conversion range including characters more than the specific number of characters.

An input method according to the present disclosure includes causing by a controller a display to display a plurality of operation keys including a conversion key and character input keys with each of which at least one symbol is associated. The input method includes, in response to detection of touches by a detection target on the character input keys displayed on a display surface of the display, causing by the controller the display to display an input character string. The input method includes, in response to detection of a touch by the detection target on the conversion key displayed on the display surface of the display in a state in which the input character string is displayed on the display surface of the display, converting by the controller the input character string into a to-be-confirmed character string, the to-be-confirmed character string including a setting target character unit corresponding to a conversion range including a specific number of characters. The input method includes, in response to detection of a touch by the detection target on the conversion key displayed on the display surface of the display, causing by the controller the display to display a conversion range reduction key and a conversion range increase key. The input method includes, in response to detection of a touch by the detection target on the conversion range reduction key displayed on the display surface of the display, causing by the controller the display to display, in place of the setting target character unit included in the to-be-confirmed character string, a setting target character unit corresponding to a conversion range including at least one character fewer than the specific number of characters. The input method includes, in response to detection of a touch by the detection target on the conversion range increase key displayed on the display surface of the display, causing by the controller the display to display, in place of the setting target character unit included in the to-be-confirmed character string, a setting target character unit corresponding to a conversion range including characters more than the specific number of characters.

DETAILED DESCRIPTION

The following describes an embodiment of the present disclosure with reference to the drawings. In the drawings, elements that are the same or equivalent are labelled using the same reference signs, and explanation of which is not repeated.

Figure 1:
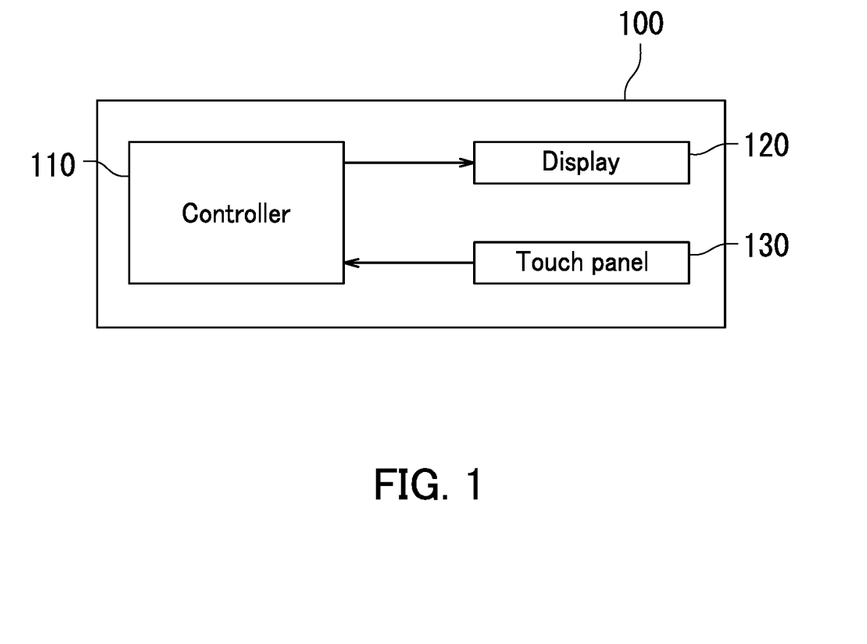
FIG. 1 is a block diagram of an input device according to an embodiment of the present disclosure.
Figure 2A:
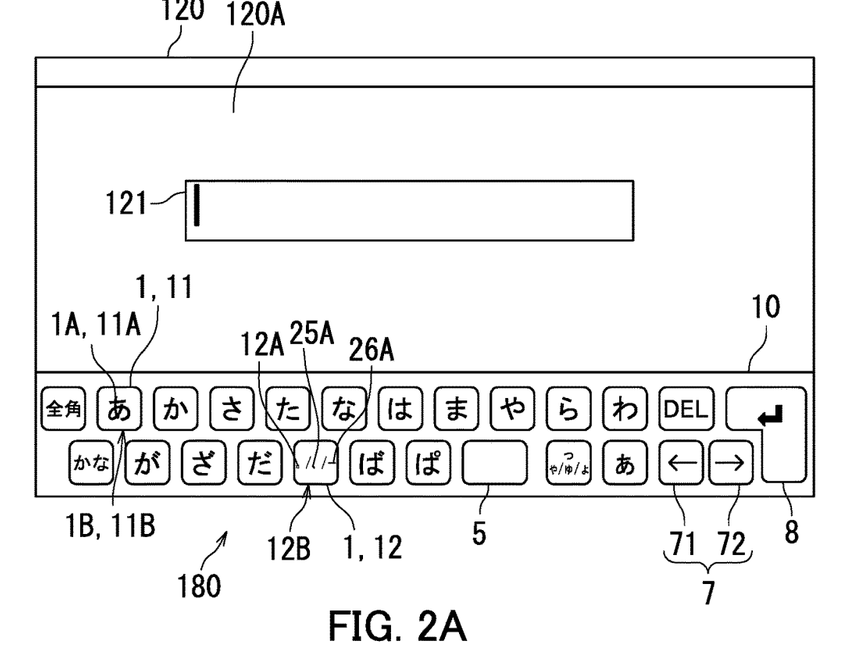
FIGS. 2A and 2B are each a schematic illustration of a display of the input device according to the embodiment of the present disclosure.
Figure 2B:
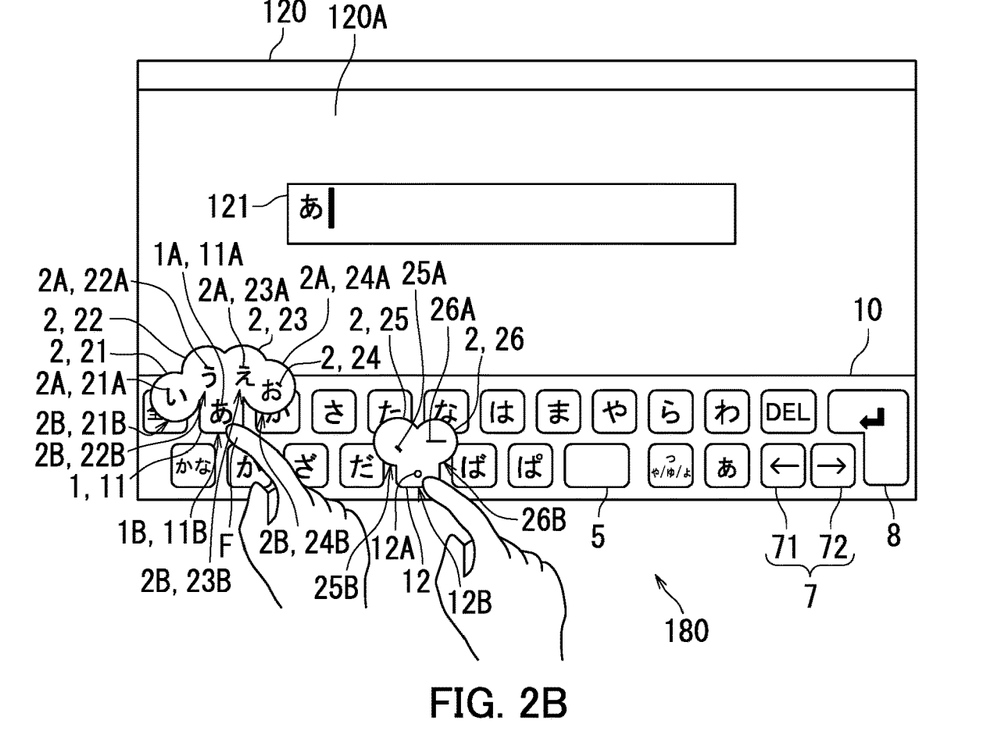

The following describes an input device 100 according to the embodiment of the present disclosure with reference to FIGS. 1, 2A, and 2B. FIG. 1 is a block diagram of the input device 100 according to the embodiment of the present disclosure. FIGS. 2A and 2B are each a schematic illustration of a display 120 of the input device 100 according to the embodiment of the present disclosure. As illustrated in FIG. 1, the input device 100 includes a controller 110, the display 120, and a touch panel 130 as a detector. The controller 110 is for example a central processing unit (CPU).

As illustrated in FIG. 2A, the display 120 has a display surface 120A. The touch panel 130 detects a touch on the display surface 120A by a detection target. In the following description, a finger F of a user of the input device 100 will be referred to as an example of the detection target.

The controller 110 causes the display 120 to display a plurality of operation keys 180. The operation keys 180 include a first key 1 (character input key), a blank key 5, movement keys 7, and an enter key 8. A plurality of symbols are associated with the first key 1. The first key 1 includes a first symbol 1A among the plurality of symbols associated with the first key 1. A lowermost part 1B of the first key 1 is located below the first symbol 1A. In a situation in which the display 120 extends in the vertical direction, the phrase "located below the first symbol 1A" means "located below the first symbol 1A in the gravity direction". In a situation in which the display 120 extends in a direction inclined from the vertical direction, the phrase "located below the first symbol 1A" means "located closer to the hand of the user of the input device 100 than the first symbol 1A". The blank key 5 is a key for inputting a blank (space). The movement keys 7 are keys for shifting a setting target character unit. The movement keys 7 include a forward movement key 71 and a backward movement key 72. The setting target character unit will be described later. The enter key 8 is a key for confirming character conversion.

In response to detection of a touch on the first key 1, the controller 110 causes the display 120 to display second keys 2 as illustrated in FIG. 2B. Each of the second keys 2 includes a second symbol 2A among the plurality of symbols associated with the first key 1. A lowermost part 2B of the second key 2 is located below the second symbol 2A. The lowermost part 2B of the second key 2 is located above the lowermost part 1B of the first key 1.

As described above with reference to FIGS. 1, 2A, and 2B, the second key 2 is prevented from being covered by the finger F according to the present embodiment. Therefore, operability is improved. The following describes the input device 100 in detail with reference to FIGS. 1 to 9B.

First, second key display control will be described with reference to FIGS. 1, 2A, and 2B. The input device 100 executes the second key display control described below in a situation in which hiragana characters are associated with the first key 1. As illustrated in FIG. 2A, the controller 110 causes the display 120 to display a keyboard 10 and an entry field 121. The keyboard 10 includes a plurality of the first keys 1. The first keys 1 are arranged in two lines along a lengthwise direction of the keyboard 10. The entry field 121 is located above the keyboard 10.

The keyboard 10 includes a first key 11 (first key 1). A plurality of symbols "あ" (a), "い" (i), "う" (u), "え" (e), and "お" (o) are associated with the first key 11. The first key 11 includes "あ" (a) as a first symbol 11A among the plurality of symbols associated with the first key 11. A lowermost part 11B of the first key 11 is located below the first symbol 11A.

In response to detection of a touch on the first key 11, the controller 110 causes the display 120 to display a second key 21 (second key 2), a second key 22 (second key 2), a second key 23 (second key 2), and a second key 24 (second key 2) as illustrated in FIG. 2B. The second key 21 includes "い" (i) as a second symbol 21A among the plurality of symbols associated with the first key 11. Similarly to the second key 21, the second key 22 includes "う" (u) as a second symbol 22A. The second key 23 includes "え" (e) as a second symbol 23A. The second key 24 includes "お" (o) as a second symbol 24A.

A lowermost part 21B of the second key 21 is located below the second symbol 21A. A lowermost part 22B of the second key 22 is located below the second symbol 22A. A lowermost part 23B of the second key 23 is located below the second symbol 23A. A lowermost part 24B of the second key 24 is located below the second symbol 24A.

The lowermost part 21B of the second key 21 is located above the lowermost part 11B of the first key 11. Also, the lowermost part 22B of the second key 22 is located above the lowermost part 11B of the first key 11. The lowermost part 23B of the second key 23 is located above the lowermost part 11B of the first key 11. The lowermost part 24B of the second key 24 is located above the lowermost part 11B of the first key 11.

The keyboard 10 further includes a first key 12 (first key 1) as illustrated in FIG. 2A. A plurality of symbols "゛", "゜", and "ー" are associated with the first key 12. The first key 12 includes "゛" as a first symbol 12A, "゜" as a second symbol 25A, and "ー" as a second symbol 26A among the plurality of symbols associated with the first key 12. A lowermost part 12B of the first key 12 is located below the first symbol 12A.

In response to detection of a touch on the first key 12, the controller 110 causes the display 120 to display a second key 25 (second key 2) and a second key 26 (second key 2) as illustrated in FIG. 2B. The controller 110 causes the first key 12 to include only the first symbol 12A in place of the first symbol 12A, the second symbol 25A, and the second symbol 26A. The second key 25 includes the second symbol 25A. The second key 26 includes the second symbol 26A. A lowermost part 25B of the second key 25 is located below the second symbol 25A. A lowermost part 26B of the second key 26 is located below the second symbol 26A. The lowermost part 25B of the second key 25 and the lowermost part 26B of the second key 26 are each located above the lowermost part 12B of the first key 12.

In response to detection of removal of the finger F from the display surface 120A, the controller 110 selects a first key 1 or a second key 2 located at a position from which the finger F is removed. The controller 110 causes the display 120 to display the entry field 121 including the first symbol 1A or the second symbol 2A included in the selected key. Specifically, when the finger F touching the first key 11 is removed from the display surface 120A, the controller 110 selects the first key 11 located at a position from which the finger F is removed. The controller 110 then causes the display 120 to display the entry field 121. The displayed entry field 121 includes the first symbol 11A included in the selected first key 11.

At least one of the first symbols 1A and the second symbols 2A represents a syllabic character including a mark that is called dakuten and used for indicating a voiced consonant or a mark that is called handaku ten and used for indicating a semi-voiced consonant. That is, a syllabic character including the mark for indicating a voiced consonant or the mark for indicating a semi-voiced consonant is associated with at least one of the first keys 1 and the second keys 2. Specifically, at least one of the following character groups "が to ご" (ga to go), "ざ to ぞ" (za to zo), "だ to ど" (da to do), to "ば to ぼ" (ba to be), and to "ぱ to ぽ" (pa to po) is associated with a first key 1 included in the keyboard 10. Alternatively, at least one of the above listed character groups is associated with a first key 1 and second keys 2 included in the keyboard 10.

Also, at least one of the first symbols 1A and the second symbols 2A represents a small kana character that is called sutegana and used for indicating a diphthong or a geminate consonant. That is, a symbol that represents a small kana character indicating a diphthong or a geminate consonant is associated with at least one of the first keys 1 and the second keys 2. Examples of the symbol that represents the small kana character include "ゃ" (ya), "ゅ" (yu), "ょ" (yo), and "っ" (tsu). Specifically, at least one of "ゃ" (ya), "ゅ" (yu), "ょ" (yo), and "っ" (tsu) is associated with a first key 1 or a second key 2 included in the keyboard 10.

As described above with reference to FIGS. 1 to 2B, in response to detection of removal of the finger F from the display surface 120A, a first key 1 or a second key 2 located at a position from which the finger F is removed is selected in the present embodiment. Therefore, the user of the input device 100 can select the first key 1 or the second key 2 by merely removing the finger F from the display surface 120A. Thus, the user of the input device 100 can input a desired symbol through a simple operation, resulting in improvement in operability.

Further, at least one of the first symbols 1A and the second symbols 2A represents a syllabic character including the mark indicating a voiced consonant or the mark indicating a semi-voiced consonant in the present embodiment. Therefore, a symbol representing a syllabic character including the mark indicating a voiced consonant or the mark indicating a semi-voiced consonant can be selected without touching any key other than the first keys 1 and the second keys 2. Thus, the user of the input device 100 can input the symbol representing the syllabic character including the mark indicating a voiced consonant or the mark indicating a semi-voiced consonant through a simple operation, resulting in improvement in operability. Examples of keys other than the first keys 1 and the second keys 2 include a shift key.

Furthermore, at least one of the first symbols 1A and the second symbols 2A represents a small kana character indicating a diphthong or a geminate consonant. Therefore, a symbol representing a small kana character indicating a diphthong or a geminate consonant can be selected without touching any key other than the first keys 1 and the second keys 2. Thus, the user of the input device 100 can input the symbol representing the small kana character indicating a diphthong or a geminate consonant through a simple operation, resulting in improvement in operability.

Also, the keyboard 10 includes the first keys 1 arranged in two lines according to the present embodiment. Therefore, the keyboard 10 can be made smaller than a JIS arrangement keyboard. Note that keys associated with hiragana characters are arranged in four lines in the JIS arrangement keyboard.

The following describes the input device 100 of the present disclosure in more detail with reference to FIGS. 1 and 3A to 8B. FIGS. 3A to 8B are each a schematic illustration of the display 120 of the input device 100 according to the embodiment of the present disclosure.

In response to detection of touches on character input keys (each being a first key 1 or a second key 2), the controller 110 causes the display 120 to display an input character string 150. For example, the user can input characters in the entry field 121 by selecting character input keys (each being a first key 1 or a second key 2). Upon selection of character input keys by the user to input the following characters "ち" (chi), "ゔ" (vu), "う" (u), "お" (o), "う" (u), "く" (ku), "た" (ta), a "ま" (ma), "っ" (tsu), "く" (ku), and "り" (ri) for example, a character string "ちゅうおうくたまつくり" (chuokutamatsikuri) is displayed as the input character string 150 in the entry field 121 as illustrated in FIG. 3A.

Figure 3A:
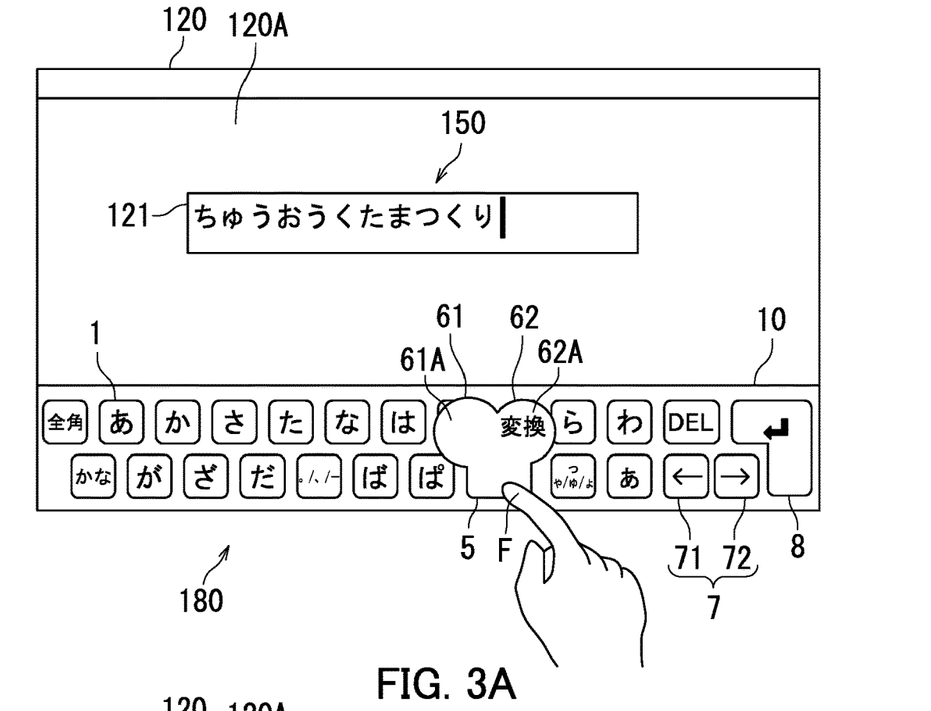
FIGS. 3A and 3B are each a schematic illustration of the display of the input device according to the embodiment of the present disclosure.

In response to detection of a touch on the blank key 5 after input of the input character string 150 using the character input keys, the controller 110 causes the display 120 to display a half-size blank key 61 and a conversion key 62 as illustrated in FIG. 3A. The blank key 5 includes a full-size blank mark as a symbol. The half-size blank key 61 includes a half-size blank mark as a symbol 61A. The conversion key 62 includes "変換" (henkan) as a symbol 62A.

When the blank key 5 is selected in a state in which the blank key 5, the half-size blank key 61, and the conversion key 62 are displayed on the display surface 120A of the display 120, the full-size blank mark is input in the entry field 121. When the half-size blank key 61 is selected, the half-size blank mark is input in the entry field 121. When the conversion key 62 is selected, the input character string 150 is converted. The following describes a situation in which the conversion key 62 is selected.

Figure 3B:
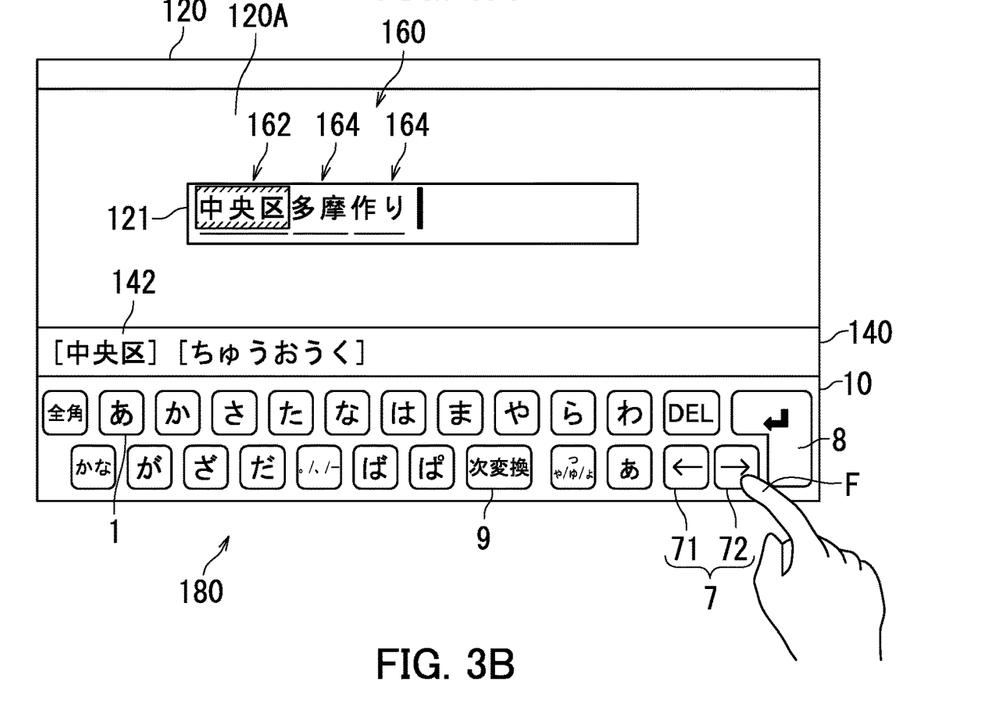

When the conversion key 62 is selected in the state illustrated in FIG. 3A, the blank key 5 changes to a conversion key 9 as illustrated in FIG. 3B. The conversion key 9 and the blank key 5 are displayed at the same position. The conversion key 9 includes "次変換" (tsugihenkan) as a symbol.

In response to detection of a touch on the conversion key 62 in a state in which the input character string 150 is displayed on the display surface 120A of the display 120 as illustrated in FIG. 3A, the controller 110 converts the input character string 150 into a to-be-confirmed character string 160 as illustrated in FIG. 3B. In the illustrated example, the controller 110 divides the input character string 150 "ちゅうおうく たまつくり" into conversion ranges "ちゅうおうく" (chuoku), "たま" (tama), and "つくり" (tsukuri) and then converts the input character string 150 into the to-be-confirmed character string 160 "中央区多摩作り" (chuokutamatsukuri). The to-be-confirmed character string 160 includes a setting target character unit 162 and character units 164. In the illustrated example, the to-be-confirmed character string 160 includes a setting target character unit 162 "中央区" (chuoku), a character unit 164 "多摩" (tama), and a character unit 164 "作り" (tsukuri). The term "setting target character unit 162" refers to a character unit that is currently set as a target of conversion setting in the to-be-confirmed character string 160. The setting target character unit 162 corresponds to a conversion range including a specific number of characters. An underline is displayed below the setting target character unit 162 and each character unit 164.

In response to detection of the touch on the conversion key 62, the controller 110 also causes the display 120 to display a plurality of conversion candidates 142. The conversion candidates 142 each correspond to the setting target character unit 162. Specifically, in response to detection of the touch on the conversion key 62, the controller 110 causes the display 120 to display a conversion candidate display field 140 above the keyboard 10. The controller 110 causes the conversion candidates 142 to be displayed in the conversion candidate display field 140. The conversion candidates 142 are for example homophonous words for the setting target character unit 162. In the illustrated example, the controller 110 causes a character string "中央区" (chuoku) and a character string "ちゅうおうく" (chuoku) to be displayed in the conversion candidate display field 140 as conversion candidates 142 corresponding to the setting target character unit 162 "中央区" (chuoku). The character string "中央区" (chuoku) and the character string "ちゅうおうく" (chuoku) have the same pronunciation but are represented differently from each other. The character string "中央区" (chuoku) is represented in Chinese characters. The character string "ちゅうおうく" (chuoku) is represented in hiragana characters.

In response to detection of a touch on one of the movement keys 7, the controller 110 shifts the setting target character unit 162. Specifically, the controller 110 shifts the setting target character unit 162 from a character unit to another character unit included in the to-be-confirmed character string 160. More specifically, in response to detection of a touch on the forward movement key 71, the controller 110 shifts the setting target character unit 162 to a character unit directly preceding a character unit that is currently set as the target of conversion setting. Alternatively, in response to detection of a touch on the backward movement key 72, the controller 110 shifts the setting target character unit 162 to a character unit next to a character unit that is currently set as the target of conversion setting. For example, in response to detection of a touch on the backward movement key 72 in the state illustrated in FIG. 3B, the controller 110 shifts the setting target character unit 162 from the character unit 中央区 "中央区" (chuoku) to the character unit "多摩" (tama) as illustrated in FIG. 4A.

Figure 4A:
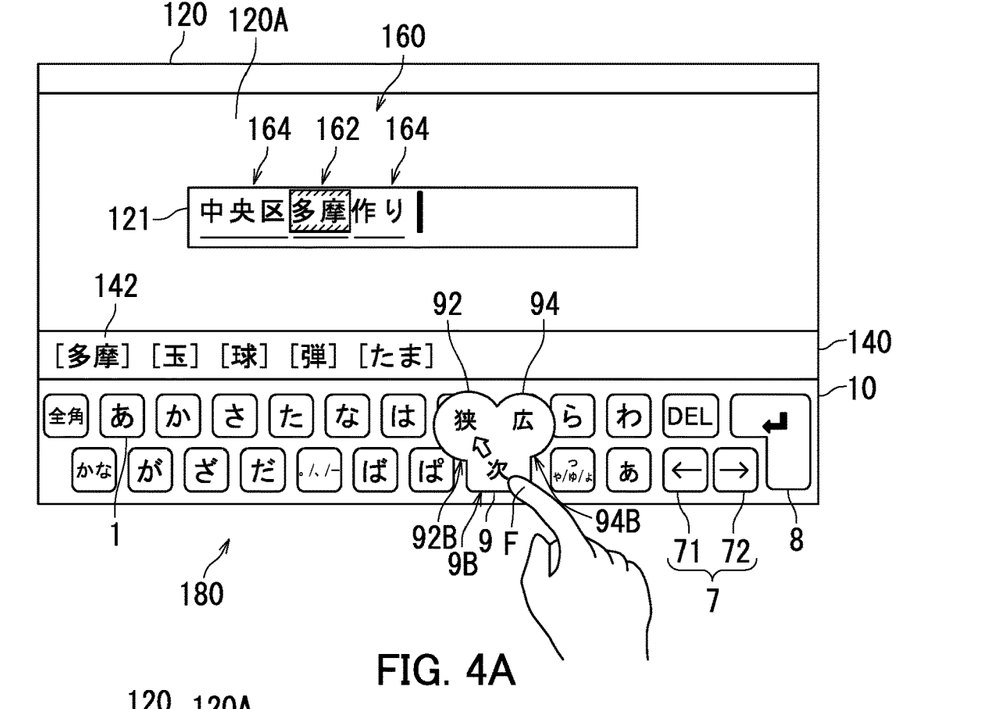
FIGS. 4A and 4B are each a schematic illustration of the display of the input device according to the embodiment of the present disclosure.
Figure 4B:
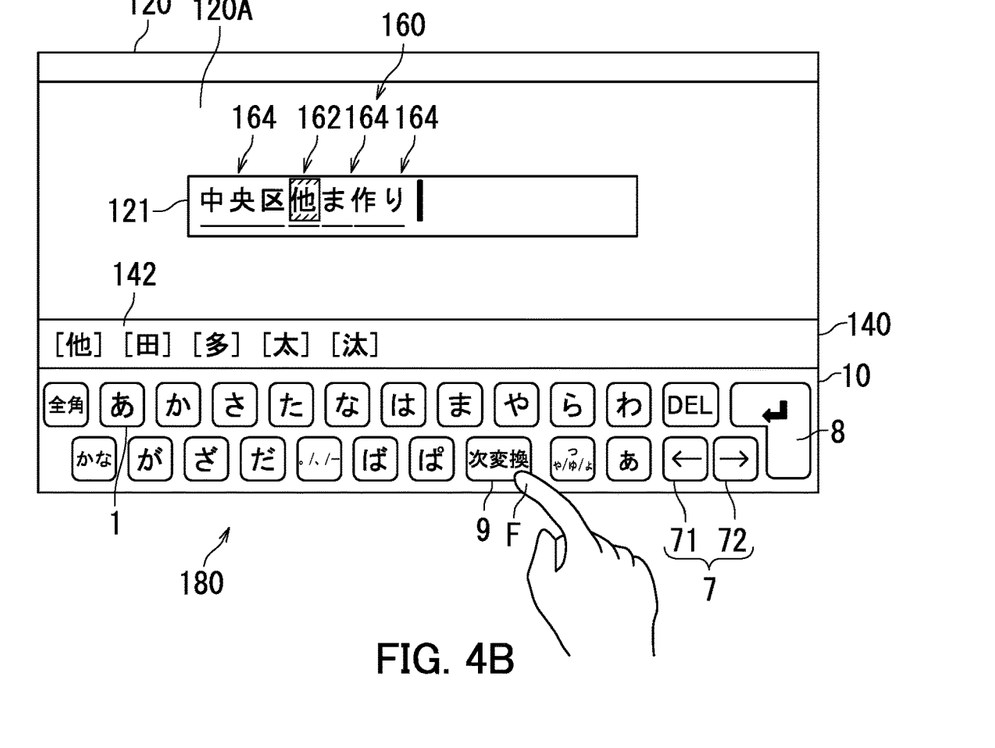

In the state illustrated in FIG. 4A, the setting target character unit 162 is shifted to the character unit "多摩" (tama). Accordingly, the controller 110 causes conversion candidates 142 corresponding to the setting target character unit 162 "多摩" (tama) to be displayed in the conversion candidate display field 140.

In response to detection of a touch on the conversion key 9, the controller 110 causes the display 120 to display a conversion range reduction key 92 and a conversion range increase key 94. Specifically, when the conversion key 9 is touched for a touch period that is equal to or longer than a threshold period, the controller 110 causes the display 120 to display the conversion range reduction key 92 and the conversion range increase key 94. The threshold period is for example two seconds. That is, when the user performs a long press operation on the conversion key 9 for two seconds or longer, the controller 110 causes the display 120 to display the conversion range reduction key 92 and the conversion range increase key 94.

The conversion range reduction key 92 includes "狭" (semai) as a symbol. The conversion range increase key 94 includes "広" (hiroi) a symbol. In a state in which the conversion range reduction key 92 and the conversion range increase key 94 are displayed on the display surface 120A of the display 120, the conversion key 9 includes "次" (tsugi) as a symbol.

The controller 110 causes the display 120 to display the conversion range reduction key 92 and the conversion range increase key 94 adjacently to the conversion key 9. A lowermost part 92B of the conversion range reduction key 92 and a lowermost part 94B of the conversion range increase key 94 are located above a lowermost part 9B of the conversion key 9 in the present embodiment.

In response to detection of a touch on the conversion range reduction key 92, the controller 110 causes the display 120 to display, in place of the setting target character unit 162 included in the to-be-confirmed character string 160, a setting target character unit 162 corresponding to a conversion range including at least one character fewer than the specific number of characters. Alternatively, in response to detection of a touch on the conversion range increase key 94, the controller 110 causes the display 120 to display, in place of the setting target character unit 162 included in the to-be-confirmed character string 160, a setting target character unit 162 corresponding to a conversion range including characters more than the specific number of characters. For example, in response to detection of a touch on the conversion range reduction key 92 in the state illustrated in FIG. 4A, the controller 110 causes the display 120 to display a setting target character unit 162 corresponding to a conversion range including one character, which is fewer than two characters included in the conversion range "たま" (tama) corresponding to the setting target character unit 162 included in the to-be-confirmed character string 160. That is, a character "他" (ta) is displayed as the setting target character unit 162 in place of the character string "多摩" (tama).

The controller 110 determines the number of characters to be subtracted from the specific number to narrow the conversion range corresponding to the setting target character unit 162 according to a touch period for which the conversion range reduction key 92 is touched. The above touch period refers to a period from when a touch on the conversion range reduction key 92 by the finger F is detected to when removal of the finger F from the conversion range reduction key 92 is detected. For example, each time the above touch period increases by 0.5 seconds, the controller 110 increments the number of characters to be subtracted from the specific number by one to narrow the conversion range corresponding to the setting target character unit 162. Also, the controller 110 determines the number of characters to be added to the specific number to widen the conversion range corresponding to the setting target character unit 162 according to a touch period for which the conversion range increase key 94 is touched. The above touch period refers to a period from when a touch on the conversion range increase key 94 by the finger F is detected to when removal of the finger F from the conversion range increase key 94 is detected. For example, each time the above touch period increases by 0.5 seconds, the controller 110 increments the number of characters to be added to the specific number by one to widen the conversion range corresponding to the setting target character unit 162.

Figure 5A:
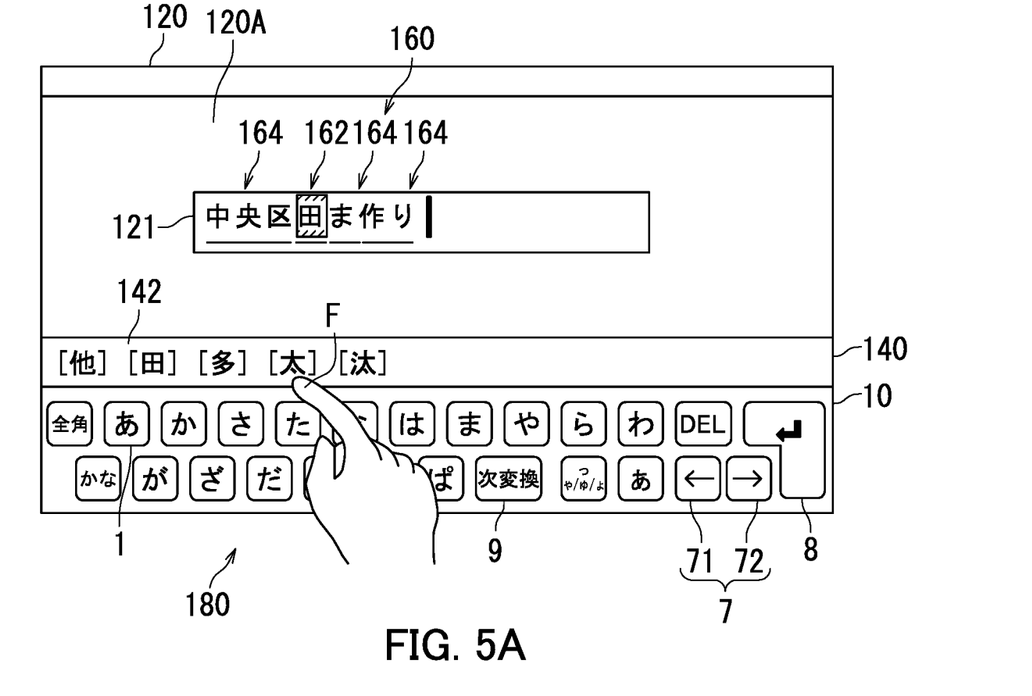
FIGS. 5A and 5B are each a schematic illustration of the display of the input device according to the embodiment of the present disclosure.

As described with reference to FIG. 4A, when the conversion key 9 is touched for a touch period that is equal to or longer than the threshold period, the controller 110 causes the display 120 to display the conversion range reduction key 92 and the conversion range increase key 94. By contrast, when removal of the finger F from the conversion key 9 is detected before elapse of the threshold period from detection of a touch on the conversion key 9 in the state illustrated in FIG. 4B, the controller 110 changes a currently selected conversion candidate 142 to another conversion candidate 142 included in a plurality of conversion candidates 142. Specifically, the controller 110 changes the currently selected conversion candidate 142 to the next conversion candidate 142 as illustrated in FIG. 5A. In the present embodiment, the controller 110 changes the selected conversion candidate 142 from the character "他" (ta) to a character "田" (ta). That is, the controller 110 changes the displayed setting target character unit 162 from the character "他" (ta) to the character "田" (ta). The character "他" (ta) and the character "田" (ta) have the same pronunciation but are represented differently and have different meanings from each other. The character "他" (ta) and the character "田" (ta) are each represented in a Chinese character.

Figure 5B:
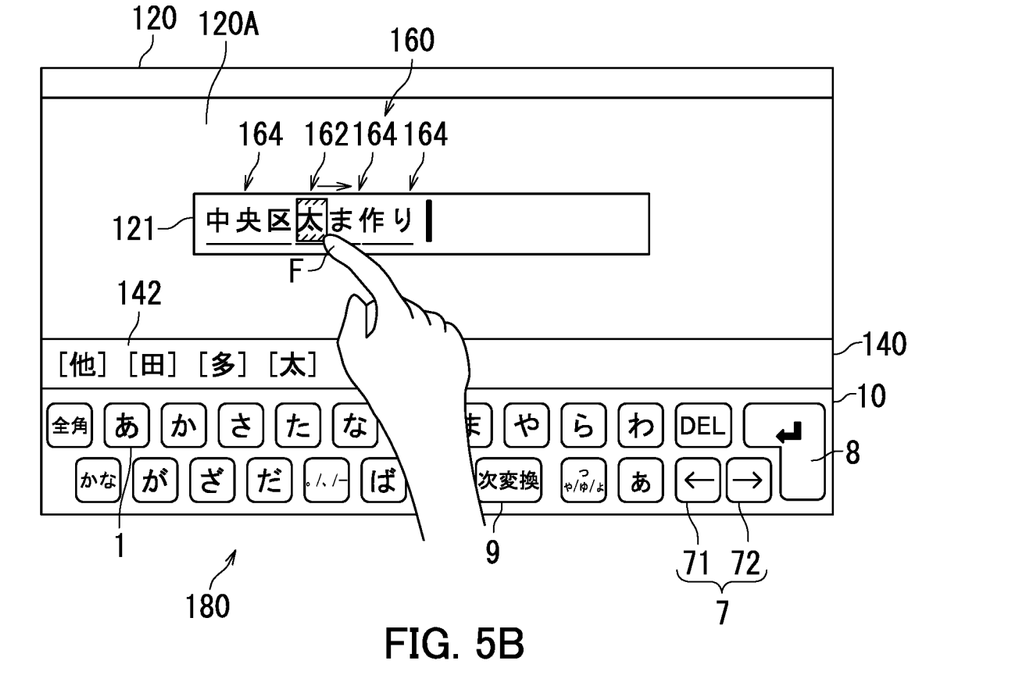

Note that the user may select a desired conversion candidate 142 by touching the conversion candidate 142. For example, when a conversion candidate 142 "太" (ta) among the conversion candidates 142 is touched as illustrated in FIG. 5A, the controller 110 changes the selected conversion candidate 142 from the character "田" (ta) to a character "太" (ta) as illustrated in FIG. 5B. The character "田" (ta) and the character "太" (ta) have the same pronunciation but are represented differently and have different meanings from each other. The character "田" (ta) and the character "太" (ta) are each represented in a Chinese character.

Figure 6A:
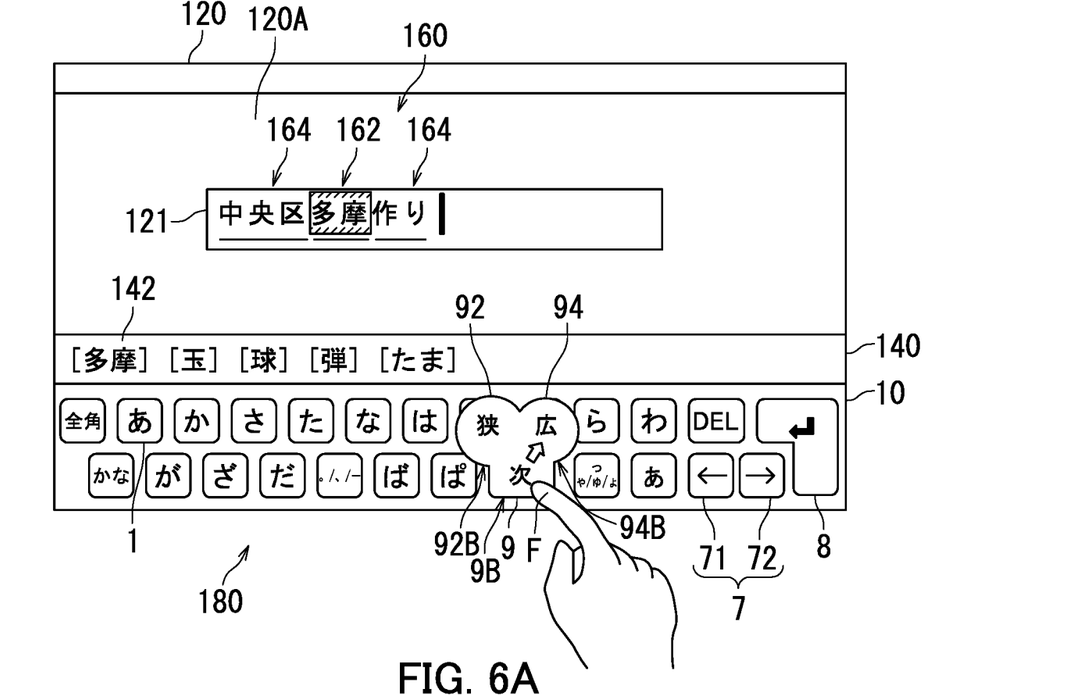
FIGS. 6A and 6B are each a schematic illustration of the display of the input device according to the embodiment of the present disclosure.

Note that the number of characters included in the conversion range corresponding to the setting target character unit 162 may be changed through a drag operation on the setting target character unit 162. For example, when the right end of the setting target character unit 162 "太" (ta) is dragged rightward as illustrated in FIG. 5B, the controller 110 changes the number of characters included in the conversion range corresponding to the setting target character unit 162 from one to two as illustrated in FIG. 6A. Upon change of the number of characters included in the conversion range corresponding to the setting target character unit 162, the controller 110 changes the setting target character unit 162 from the character "太" (ta) to the character string "多摩" (tama) in the present embodiment.

Figure 6B:
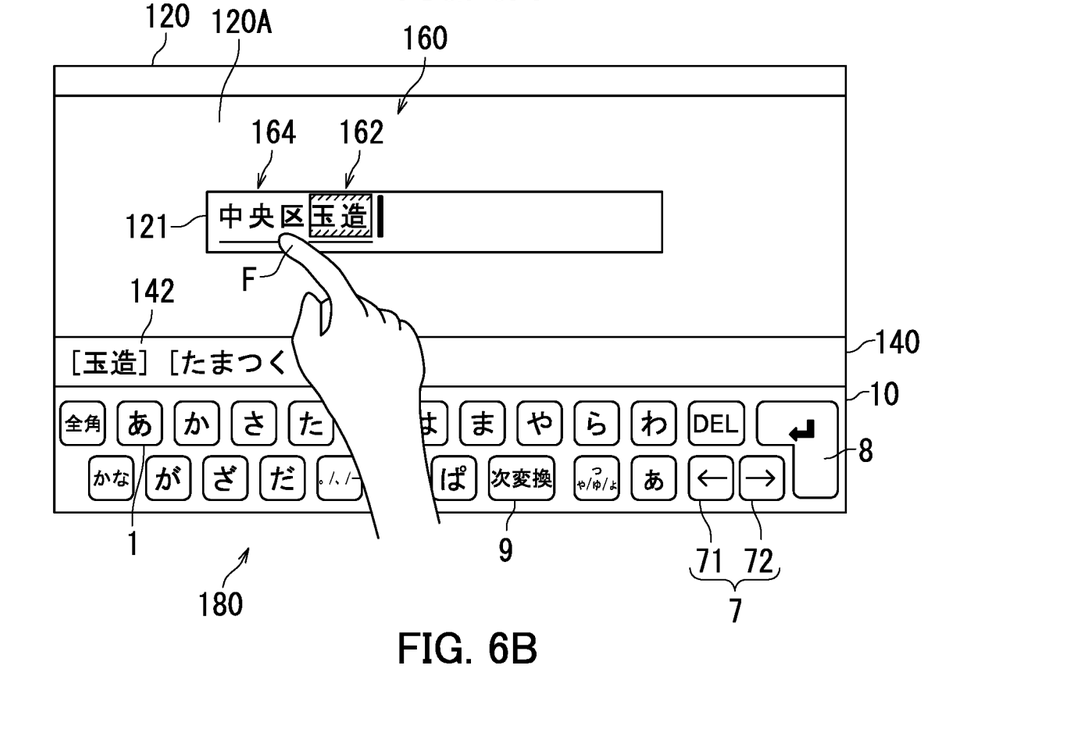

In response to detection of a touch on the conversion key 9, the controller 110 causes the display 120 to display the conversion range reduction key 92 and the conversion range increase key 94 as illustrated in FIG. 6A. In the illustrated example, in response to detection of a touch on the conversion range increase key 94 in the state illustrated in FIG. 6A, the controller 110 causes the display 120 to display a setting target character unit 162 corresponding to a conversion range including five characters, which is more than two characters included in the conversion range "たま" (tama) corresponding to the current setting target character unit 162. That is, upon change of the number of characters included in the conversion range corresponding to the setting target character unit 162, the controller 110 changes the setting target character unit 162 from the character string "多摩" (tama) to a character string "玉造" (tamatsukuri) as illustrated in FIG. 6B.

Note that the setting target character unit 162 may be shifted through a touch on a character unit 164 included in the to-be-confirmed character string 160. For example, in response to detection of a touch on the character unit 164 "中央区" (chuoku) as illustrated in FIG. 6B, the controller 110 shifts the setting target character unit 162 from a character unit "玉造" (tamatsukuri) to the character unit "中央区" (chuoku) as illustrated in FIG. 7A.

Figure 7A:
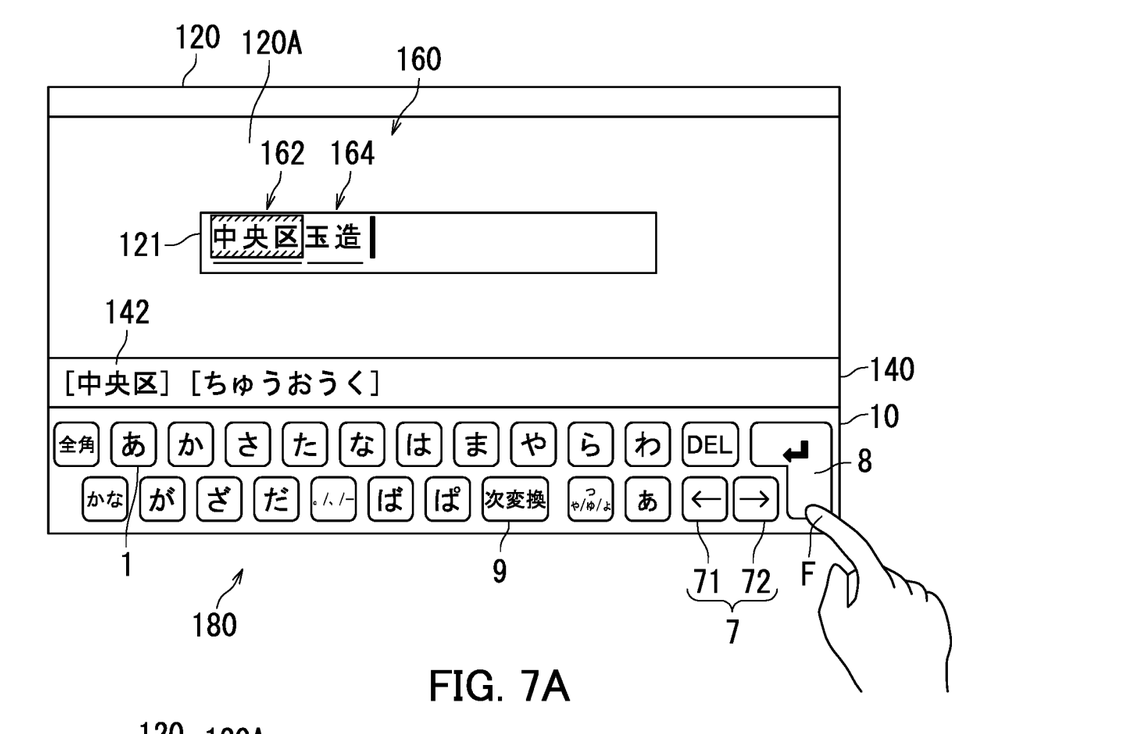
FIGS. 7A and 7B are each a schematic illustration of the display of the input device according to the embodiment of the present disclosure.
Figure 7B:
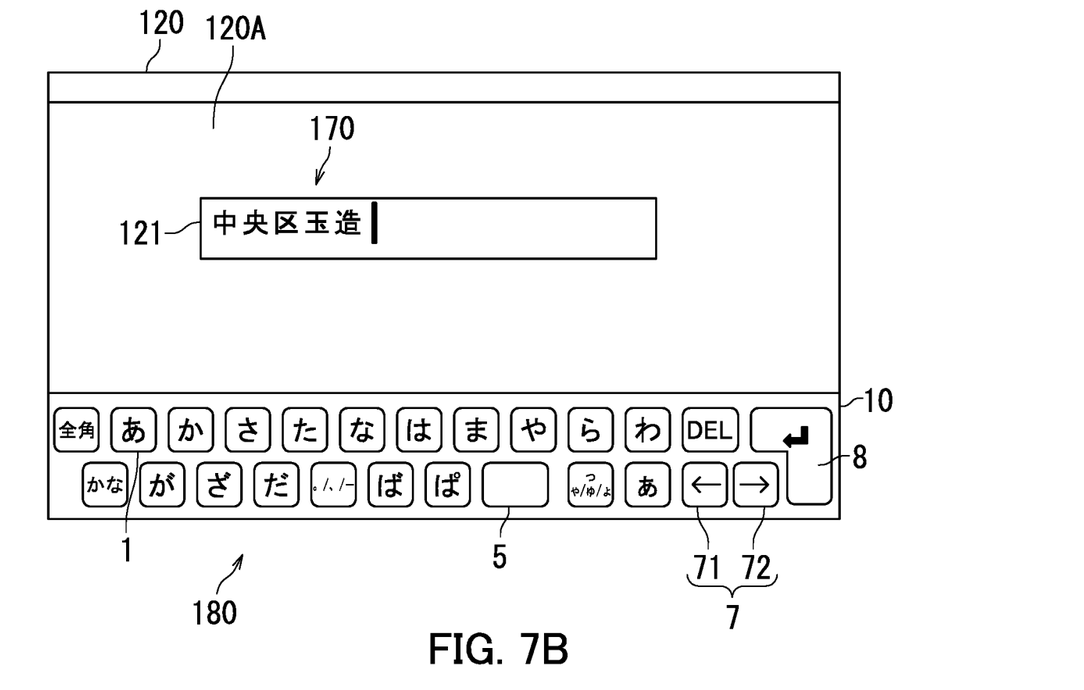

In response to detection of a touch on the enter key 8 in the state illustrated in FIG. 7A, the controller 110 confirms character conversion. That is, the controller 110 confirms the to-be-confirmed character string 160 as a confirmed character string 170. In response to detection of the touch on the enter key 8, the controller 110 erases underlines displayed below the character units "中央区" (chuoku) and "玉造" (tamatsukuri). Through the above, the user can recognize that input of the to-be-confirmed character string "中央区玉造" (chuoku tamatsukuri) is confirmed. Upon confirmation of the to-be-confirmed character string 160 as the confirmed character string 170, the controller 110 changes the conversion key 9 to the blank key 5.

Through the processing described with reference to FIGS. 3A to 7B, the input character string 150 is converted into the confirmed character string 170.

Figure 8A:
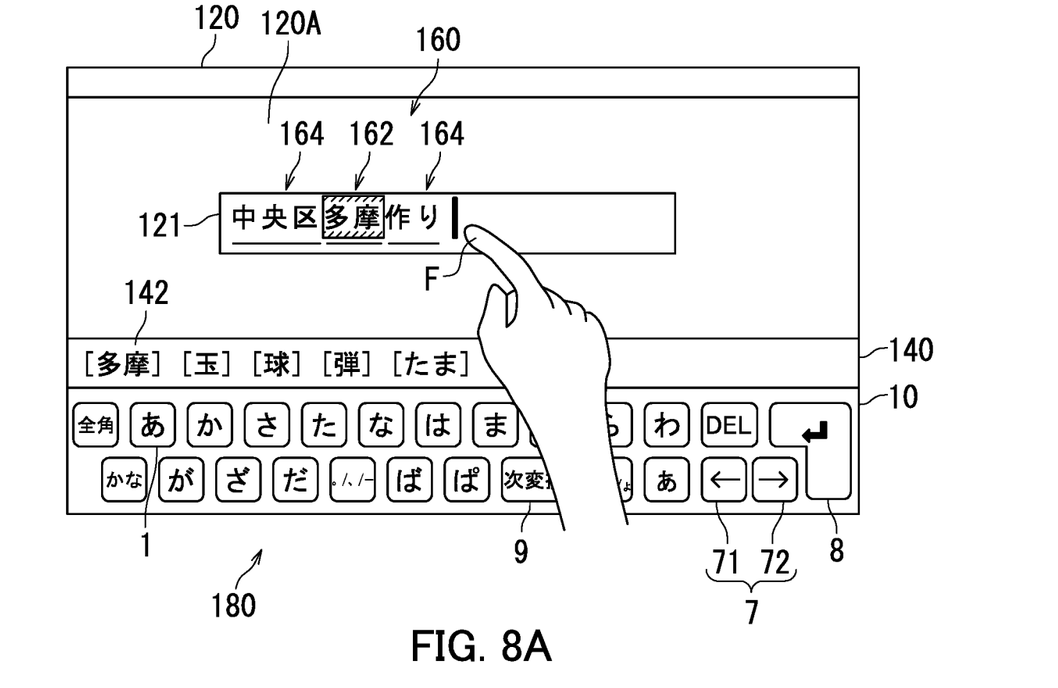
FIGS. 8A and 8B are each a schematic illustration of the display of the input device according to the embodiment of the present disclosure.
Figure 8B:
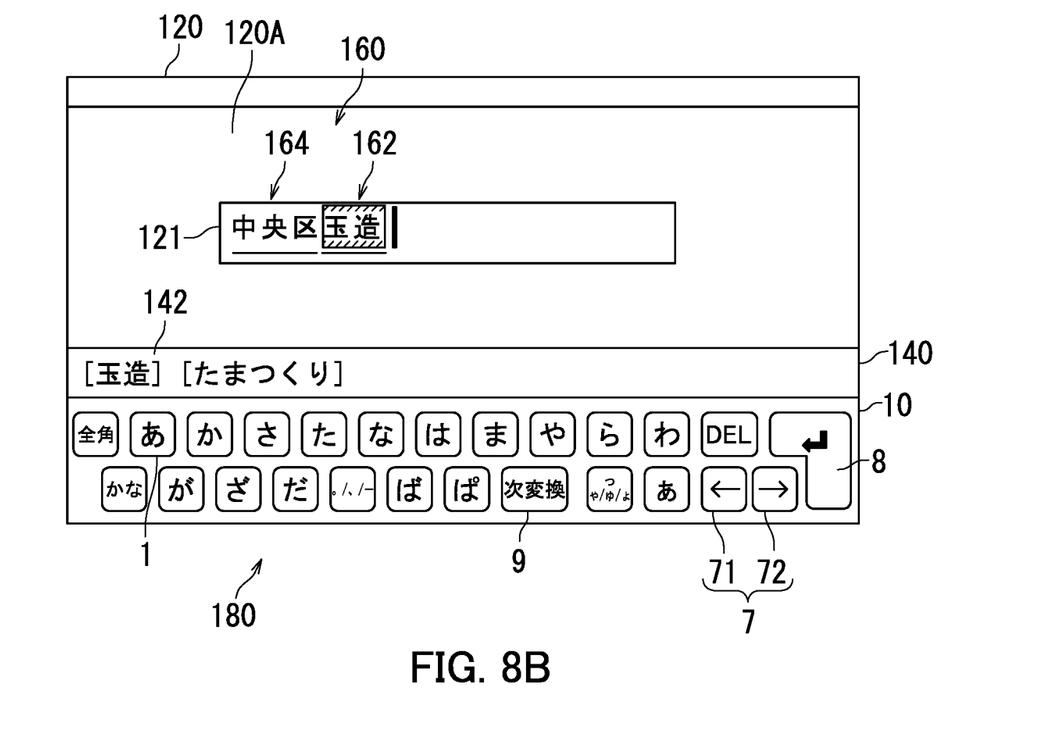

Note that the number of characters included in the conversion range corresponding to the setting target character unit 162 may be changed through a touch operation. For example, when a region on the right side of the character unit 164 "作り" (tsukuri) is touched as illustrated in FIG. 8A, the controller 110 changes the number of characters included in the conversion range corresponding to the setting target character unit 162 from two to five. Upon change of the number of characters included in the conversion range corresponding to the setting target character unit 162, the controller 110 changes the setting target character unit 162 from the character string "多摩" (tama) to the character string "玉造" (tamatsukuri) as illustrated in FIG. 8B. Alternatively, when a space between "作" (tsu/u) and "り" (ri) is touched or both characters "作" (tsuku) and "り" (ri) are touched, the controller 110 changes the number of characters included in the conversion range corresponding to the setting target character unit 162 from two to five.

As described above with reference to FIGS. 1 to 8B, in response to detection of a touch on the conversion range reduction key 92, the controller 110 of the input device 100 causes the display 120 to display a setting target character unit 162 corresponding to a conversion range including at least one character fewer than the specific number of characters. Alternatively, in response to detection of a touch on the conversion range increase key 94, the controller 110 causes the display 120 to display a setting target character unit 162 corresponding to a conversion range including characters more than the specific number of characters. Thus, the conversion range corresponding to the setting target character unit 162 can be easily widened or narrowed.

Also, the controller 110 determines the number of characters to be subtracted from the specific number to narrow the conversion range corresponding to the setting target character unit 162 according to a touch period for which the conversion range reduction key 92 is touched. Alternatively, the controller 110 determines the number of characters to be added to the specific number to widen the conversion range corresponding to the setting target character unit 162 according to a touch period for which the conversion range increase key 94 is touched. Thus, the conversion range corresponding to the setting target character unit 162 can be easily widened or narrowed as desired.

Also, when the conversion key 9 is touched for a touch period that is equal to or longer than the threshold period, the controller 110 causes the display 120 to display the conversion range reduction key 92 and the conversion range increase key 94. That is, the display 120 displays the conversion range reduction key 92 and the conversion range increase key 94 in response to a long press operation on the conversion key 9 by the user. By contrast, when removal of the finger F from the conversion key 9 is detected before elapse of the threshold period from detection of a touch on the conversion key 9, the controller 110 changes the currently selected conversion candidate 142 to the next conversion candidate 142. Thus, the input device 100 can be operated differently according to a period for which the conversion key 9 is touched.

Also, the controller 110 causes the display 120 to display the conversion range reduction key 92 and the conversion range increase key 94 adjacently to the conversion key 9. In the above configuration, the user can easily narrow or widen the conversion range corresponding to the setting target character unit 162 by sliding the finger F from the conversion key 9 to the conversion range reduction key 92 or the conversion range increase key 94.

Further, the lowermost part 92B of the conversion range reduction key 92 and the lowermost part 94B of the conversion range increase key 94 are located above the lowermost part 9B of the conversion key 9. In the above configuration, the conversion range reduction key 92 and the conversion range increase key 94 displayed on the display surface 120A the display 120 are prevented from being covered by the finger F. The above results in improvement in visibility of the conversion range reduction key 92 and the conversion range increase key 94 and improvement in operability of the input device 100.

Further, in response to detection of a touch on the conversion key 62, the controller 110 causes the display 120 to display a plurality of conversion candidates 142 corresponding to the setting target character unit 162. Therefore, the user can easily convert the setting target character unit 162 by selecting a desired character or character string from the plurality of conversion candidates 142.

Further, in response to detection of a touch on the conversion key 9, the controller 110 changes a selected conversion candidate 142 among the plurality of conversion candidates 142. Therefore, the user can easily select a desired character or character string from the plurality of conversion candidates 142.

Also, in response to detection of a touch on one of the movement keys 7, the controller 110 shifts the setting target character unit 162. That is, the controller 110 shifts the setting target character unit 162 from a character unit to another character unit included in the to-be-confirmed character string 160. Therefore, the user can easily select a character unit that the user intends to convert.

Also, the conversion key 9 and the blank key 5 are displayed at the same position. In the above configuration, the keyboard 10 can be downsized.

Figure 9A:
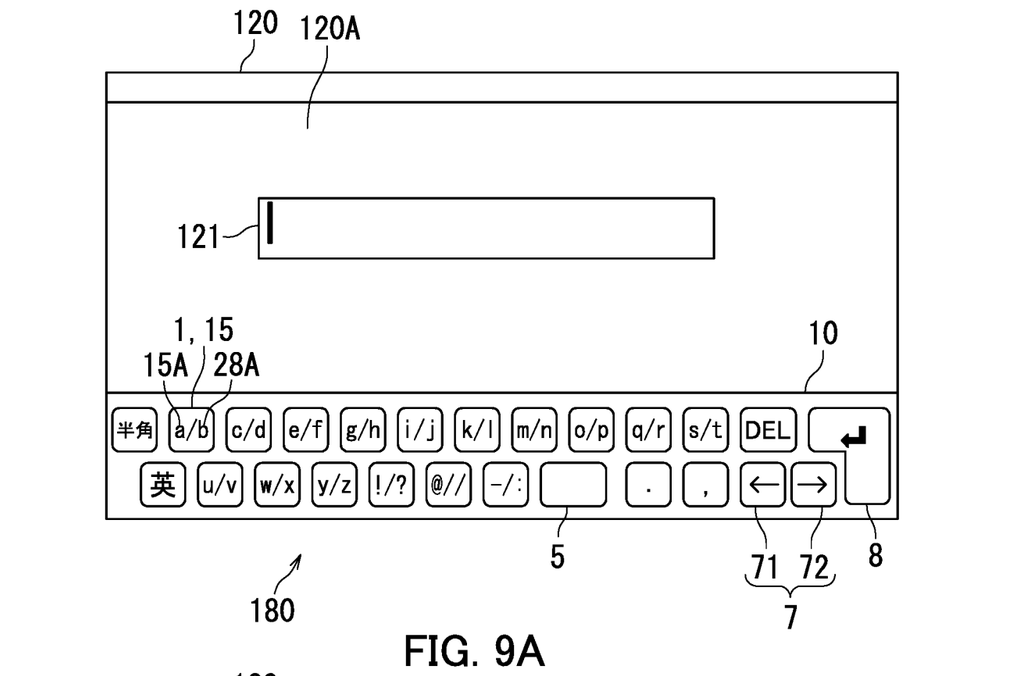
FIGS. 9A and 9B are each a schematic illustration of the display of the input device according to the embodiment of the present disclosure.
Figure 9B:
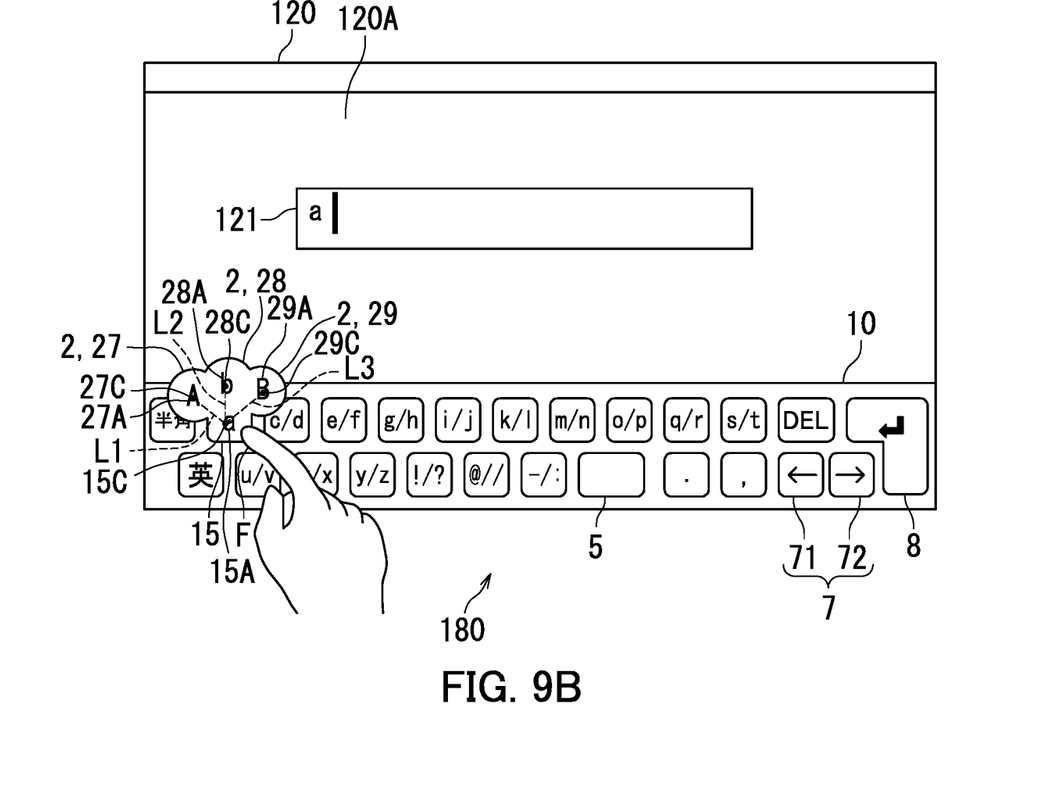

The following describes with reference to FIGS. 1, 9A, and 9B second key display control that the input device 100 executes in a situation in which alphabets are associated with the first key 1. FIGS. 9A and 9B are each a schematic illustration of the display 120 of the input device 100 according to the embodiment of the present disclosure.

The keyboard 10 includes a first key 15 (first key 1). A plurality of symbols "a", "A", "b", and "B" are associated with the first key 15. Each of the symbols associated with the first key 15 is a half-size character. The first key 15 includes "a" as a first symbol 15A and "b" as a second symbol 28A among the plurality of symbols associated with the first key 15.

In response to detection of a touch on the first key 15, the controller 110 causes the display 120 to display a second key 27 (second key 2), a second key 28 (second key 2), and a second key 29 (second key 2) as illustrated in FIG. 9B. The controller 110 causes the first key 15 to include only the first symbol 15A in place of the first symbol 15A and the second symbol 28A. The second key 27 includes "A" as a second symbol 27A. The second key 28 includes "b" as the second symbol 28A. The second key 29 includes "B" as a second symbol 29A.

The plurality of second keys 2 are displayed in the present embodiment. Centers of the respective second keys 2 are located at the same distance from a center 15C of the first key 15. Specifically, a distance L1 between a center 27C of the second key 27 and the center 15C of the first key 15, a distance L2 between a center 28C of the second key 28 and the center 15C, and a distance L3 between a center 29C of the second key 29 and the center 15C are equal to one another. That is, the second keys 27, 28, and 29 are arcuately arranged with respect to the first key 15.

As described above with reference to FIGS. 1, 9A, and 9B, the centers of the respective second keys 2 are located at the same distance from the center of the first key 1. In the above configuration, visibility of the plurality of second keys 2 displayed on the display surface 120A of the display 120 is improved. The above results in improvement in operability of the input device 100. Also, the above results in improvement in design of a plurality of keys displayed on the display surface 120A of the display 120.

Figure 10A:
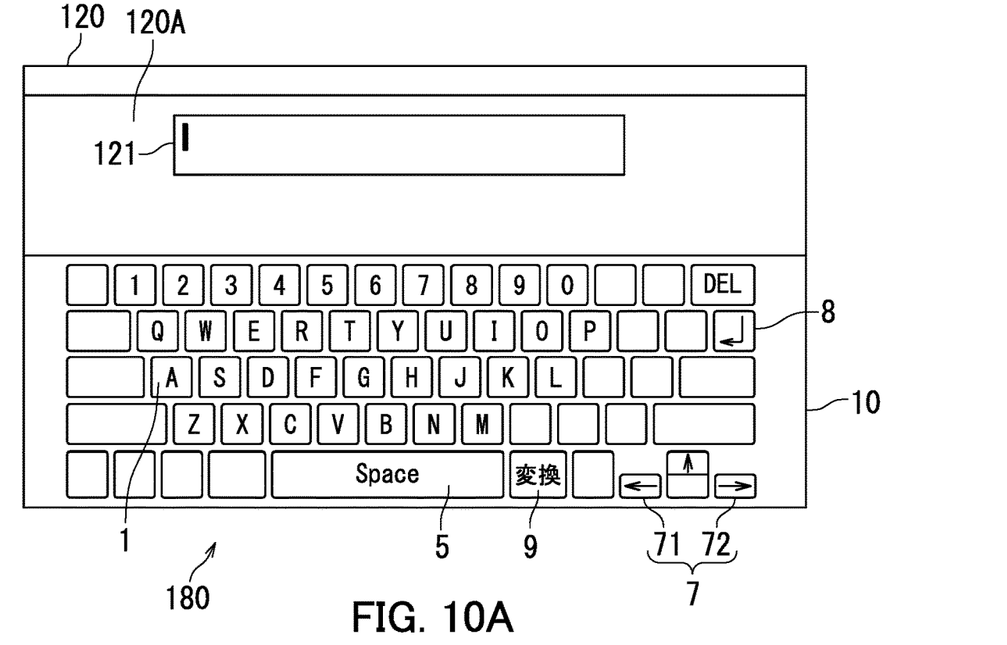
FIGS. 10A and 10B are each a schematic illustration of the display of the input device according to the embodiment of the present disclosure.
Figure 10B:
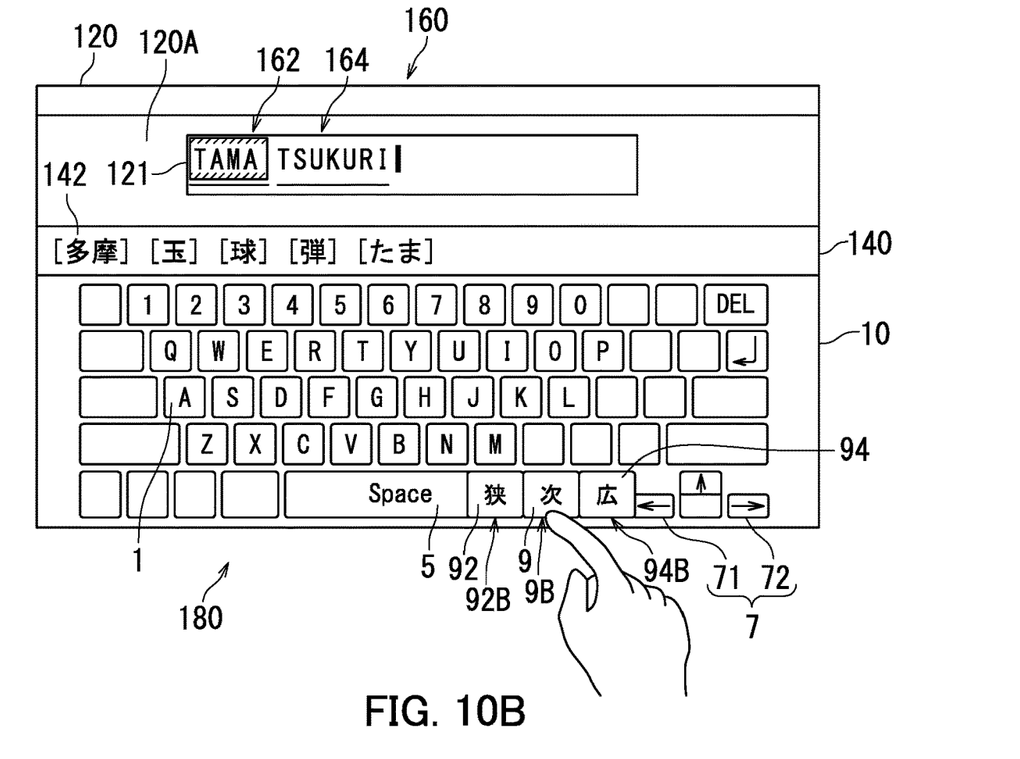

The present disclosure is applicable to widely employed key arrangements such as the one employed in the JIS arrangement keyboard. FIGS. 10A and 10B are each a schematic illustration of the display 120 of the input device 100 according to a variation of the embodiment of the present disclosure.

As illustrated in FIGS. 10A and 10B, the controller 110 causes the display 120 to display a plurality of operation keys 180. The plurality of operation keys 180 include the first key 1 (character input key), the blank key 5, the movement keys 7, the enter key 8, and the conversion key 9. The blank key 5 and the conversion key 9 are displayed at different locations in this variation of the present embodiment.

In response to detection of a touch on the conversion key 9 in the state illustrated in FIG. 10A, the controller 110 causes the display 120 to display the conversion range reduction key 92 and the conversion range increase key 94 as illustrated in FIG. 10B. The conversion range reduction key 92 is displayed on the left side of the conversion key 9 in the present embodiment. The conversion range increase key 94 is displayed on the right side of the conversion key 9. The lowermost part 9B of the conversion key 9, the lowermost part 92B of the conversion range reduction key 92, and the lowermost part 94B of the conversion range increase key 94 are aligned in the present embodiment.

Through the above, the embodiment of the present disclosure has been described with reference to the drawings (FIGS. 1 to 10B). However, the present disclosure is not limited to the above embodiment and may be practiced in various manners within a scope not departing from the gist of the present disclosure (for example, as described below in (1) and (2)). The drawings schematically illustrate elements of configuration in order to facilitate understanding thereof. Properties such as thickness and length and the number of the elements of configuration illustrated in the drawings may differ from actual properties and the number thereof in order to facilitate preparation of the drawings. Also, materials, shapes, dimensions and the like of elements of configuration described in the embodiment are mere examples and not intended as specific limitations. Various alterations may be made within a scope not substantially departing from the effects of the present disclosure.

(1) In the embodiment described with reference to FIGS. 1 to 10B, the detection target is the finger F with which the user touches the display surface 120A of the display 120. However, the detection target may be a stylus (not illustrated) with which the user touches the display surface 120A.

(2) Although the conversion range reduction key 92 and the conversion range increase key 94 described with reference to FIGS. 1 to 10B are displayed above the conversion key 9 or on the left side and the right side of the conversion key 9, they may be displayed above and below the conversion key 9. For example, the conversion range reduction key 92 may be displayed above the conversion key 9 and the conversion range increase key 94 may be displayed below the conversion key 9.

What is claimed is:

1. An input device comprising:
a display having a display surface;
a detector including a touch panel and configured to detect a touch on the display surface by a detection target; and
a controller including a processor and configured to cause the display to display a plurality of operation keys, wherein
the plurality of operation keys include a conversion key and character input keys with each of which at least one symbol is associated,
in response to detection of touches on the character input keys by the detection target, the controller causes the display to display an input character string,
in response to detection of a touch on the conversion key by the detection target in a state in which the input character string is displayed on the display surface of the display, the controller converts the input character string into a to-be-confirmed character string,
in response to detection of a touch on the conversion key by the detection target, the controller causes the display to change to a state of displaying a conversion range reduction key and a conversion range increase key adjacent to the conversion key from a state of displaying the conversion key without displaying the conversion range reduction key and the conversion range increase key,
the to-be-confirmed character string includes a setting target character unit,
the setting target character unit corresponds to a conversion range including a specific number of characters,
in response to detection of a touch on the conversion range reduction key by the detection target, the controller causes the display to display, in place of the setting target character unit included in the to-be-confirmed character string, a setting target character unit corresponding to a conversion range including at least one character fewer than the specific number of characters,
in response to detection of a touch on the conversion range increase key by the detection target, the controller causes the display to display, in place of the setting target character unit included in the to-be-confirmed character string, a setting target character unit corresponding to a conversion range including characters more than the specific number of characters, and
in response to detection of a touch on a right side of the conversion range corresponding to the setting target character unit displayed on the display surface, the controller causes the display to display, in place of the setting target character unit included in the to-be-confirmed character string, a setting target character unit corresponding to a conversion range including characters the number of which is larger than the specific number of characters.

2. The input device according to claim 1, wherein
the controller determines
the number of characters to be subtracted from the specific number to narrow the conversion range corresponding to the setting target character unit included in the to-be-confirmed character string according to a touch period for which the conversion range reduction key is touched by the detection target, and
the number of characters to be added to the specific number to widen the conversion range corresponding to the setting target character unit included in the to-be-confirmed character string according to a touch period for which the conversion range increase key is touched by the detection target.

3. The input device according to claim 1, wherein
when the conversion key is touched by the detection target for a touch period that is equal to or longer than a threshold period, the controller causes the display to display the conversion range reduction key and the conversion range increase key.

4. The input device according to claim 1, wherein
the controller causes the display to display the conversion range reduction key and the conversion range increase key adjacently to the conversion key.

5. The input device according to claim 1, wherein
a lowermost part of the conversion range reduction key and a lowermost part of the conversion range increase key are located above a lowermost part of the conversion key.

6. The input device according to claim 1, wherein
in response to detection of the touch on the conversion key by the detection target, the controller causes the display to display a plurality of conversion candidates each corresponding to the setting target character unit included in the to-be-confirmed character string.

7. The input device according to claim 6, wherein
in response to detection of a touch on the conversion key by the detection target, the controller changes a selected conversion candidate among the plurality of conversion candidates.

8. The input device according to claim 1, wherein
the plurality of operation keys further include a movement key for shifting the setting target character unit included in the to-be-confirmed character string, and
in response to detection of a touch on the movement key, the controller shifts the setting target character unit included in the to-be-confirmed character string.

9. The input device according to claim 1, wherein
the plurality of operation keys further include a blank key for inputting a blank, and
the conversion key and the blank key are displayed at the same position.

10. An input method comprising:
causing by a controller a display to display a plurality of operation keys including a conversion key and character input keys with each of which at least one symbol is associated;
in response to detection of touches by a detection target on the character input keys displayed on a display surface of the display, causing by the controller the display to display an input character string;
in response to detection of a touch by the detection target on the conversion key displayed on the display surface of the display in a state in which the input character string is displayed on the display surface of the display, converting by the controller the input character string into a to-be-confirmed character string, the to-be-confirmed character string including a setting target character unit corresponding to a conversion range including a specific number of characters;
in response to detection of a touch by the detection target on the conversion key displayed on the display surface of the display, causing by the controller the display to change to a state of displaying a conversion range reduction key and a conversion range increase key adjacent to the conversion key from a state of displaying the conversion key without displaying the conversion range reduction key and the conversion range increase key;
in response to detection of a touch by the detection target on the conversion range reduction key displayed on the display surface of the display, causing by the controller the display to display, in place of the setting target character unit included in the to-be-confirmed character string, a setting target character unit corresponding to a conversion range including at least one character fewer than the specific number of characters;
in response to detection of a touch by the detection target on the conversion range increase key displayed on the display surface of the display, causing by the controller the display to display, in place of the setting target character unit included in the to-be-confirmed character string, a setting target character unit corresponding to a conversion range including characters more than the specific number of characters; and
in response to detection of a touch on a right side of the conversion range corresponding to the setting target character unit displayed on the display surface, causing by the controller the display to display, in place of the setting target character unit included in the to-be-confirmed character string, a setting target character unit corresponding to a conversion range including characters the number of which is larger than the specific number of characters.

* * * * *